United States Patent [19]
Cappels, Sr.

[11] Patent Number: 5,396,151
[45] Date of Patent: Mar. 7, 1995

[54] CIRCUIT FOR REDUCING ELF ELECTRIC FIELDS RADIATED FROM CRT DEVICES

[75] Inventor: Richard D. Cappels, Sr., San Jose, Calif.

[73] Assignee: Apple Computer, Inc., Cupertino, Calif.

[21] Appl. No.: 84,291

[22] Filed: Jun. 28, 1993

[51] Int. Cl.⁶ .............................................. H01J 29/06
[52] U.S. Cl. .......................................... 315/8; 315/85; 315/349; 315/291
[58] Field of Search ...................... 315/85, 8, 349, 355, 315/307, 291; 358/190; 307/296.6, 282, 260

[56] References Cited

U.S. PATENT DOCUMENTS

| | | | |
|---|---|---|---|
| 4,823,248 | 4/1989 | Ikeuchi et al. | 358/190 X |
| 5,043,598 | 8/1991 | Maeda et al. | 307/296.6 |
| 5,151,635 | 9/1992 | Cappels | 315/8 X |

Primary Examiner—Robert J. Pascal
Assistant Examiner—Haissa Philogene
Attorney, Agent, or Firm—John S. Ferrell; Nancy R. Simon

[57] ABSTRACT

A circuit for reducing extremely low frequency (ELF) electric fields on cathode ray robe (CRT) devices comprises a power supply means, a CRT, a voltage sensing means, an amplification means, and a capacitive coupling within a feedback path to the CRT. A CRT anode voltage variation sensed by the voltage sensing means is amplified and inverted by the amplification means, producing a signal which is applied to the capacitive coupling within the feedback path. This signal modifies the impedance at the CRT anode, decreasing the voltage variation and thereby reducing ELF electric field magnitudes.

16 Claims, 6 Drawing Sheets

CIRCUIT FOR REDUCING ELF ELECTRIC FIELDS RADIATED FROM CRT DEVICES

BACKGROUND OF THE INVENTION

1. Field of the Invention

The present invention relates generally to cathode ray tube (CRT) devices, and more particularly to a circuit which reduces extremely low frequency (ELF) electric fields emanating from CRT devices through production of a gain-modified impedance at the CRT anode.

2. Description of the Background Art

Changes in information displayed on a CRT device or user adjustment of CRT display controls, such as brightness and contrast, unpredictably alter the CRT electron beam current, giving rise to corresponding variations in the CRT anode voltage. As a result, the anode acts as a radiating element, producing extremely low frequency (ELF) electric fields. The presence of ELF electric fields may pose a potential health risk to CRT users, although no definitive conclusion in this regard has been made to date. Since a user may be required to view the CRT screen for several hours each day, potential health effects must be minimized.

In light of this, manufacturers of CRT-based display devices have taken various approaches toward the reduction of ELF electric fields. In a first approach, shielding is selectively used on the CRT in order to attenuate the electric field. One common type of shielding consists of a metal layer applied to a casing which encloses the CRT. On the front of the CRT display, shielding requires use of a specialized transparent coating capable of attenuating electric fields. Such coatings typically degrade image quality or significantly increase the cost of CRT manufacture.

Figure 1:
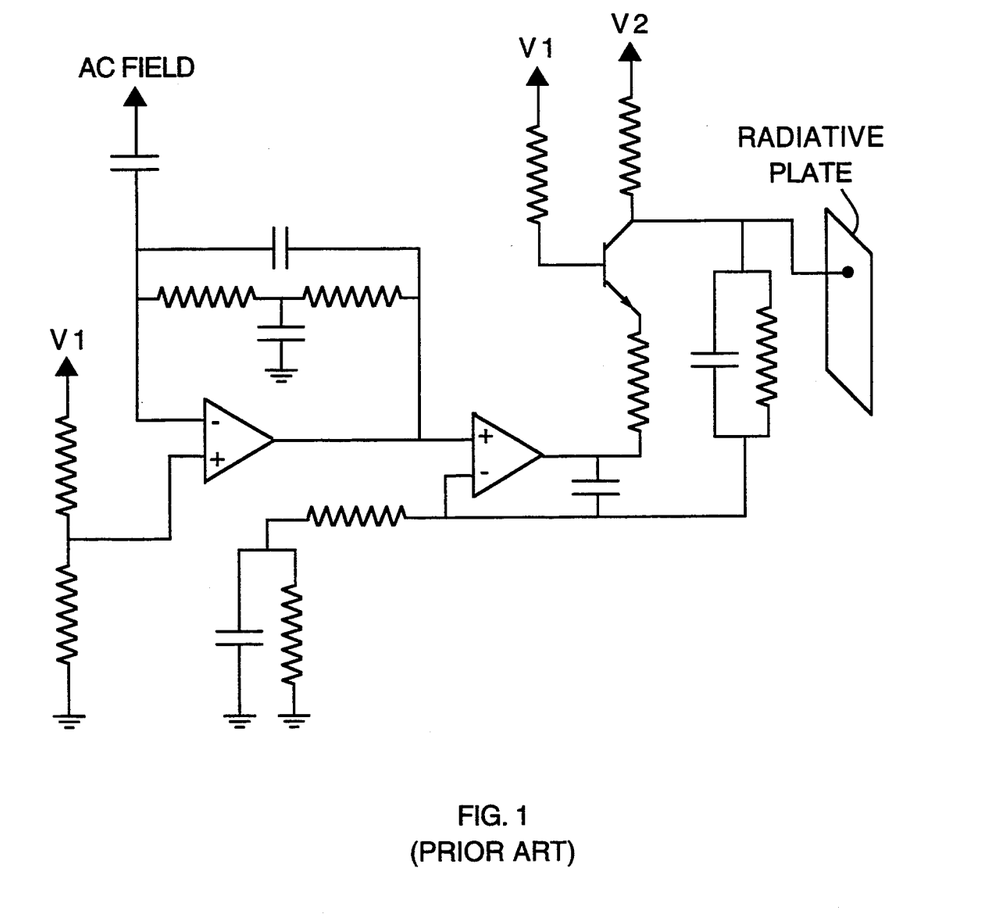
FIG. 1 illustrates a diagram of circuitry used in prior art for radiative cancellation of ELF electric fields.

Another approach utilizes a circuit of the type shown in FIG. 1, in which the unwanted ELF electric field is capacitively sensed, inverted, and amplified in order to produce an inverted replica of the voltage waveform at the anode. This signal is then radiated back towards the CRT through a radiating strip or plate. In order for cancellation to be effective, the location of the ELF electric field sensing means and the gain provided by the amplification means must be properly chosen in order to account for possible asymmetries in the magnitude of the ELF electric field surrounding the CRT. A similar consideration applies to the cancellation signal radiating means. In addition, nonlinearity and phase distortion present in the amplification means must be minimized. These considerations complicate CRT design and manufacture.

Since the CRT anode radiates ELF electric fields as a result of anode voltage variation, other approaches for reducing the magnitude of ELF electric fields rely upon reducing this voltage variation. This type of approach offers the added benefits of reduced geometric image distortion and greater image stability. One such method involves the use of a voltage-regulated power supply, in which electronic circuitry coupled to the power supply ensures relatively constant voltage output at the CRT anode. A circuit which functions in this manner is described in U.S. Pat. No. 5,043,598; this circuit regulates a CRT anode voltage by subtracting a variable voltage from the voltage present across a flyback transformer. A major disadvantage of this circuit is that the dynamic range of the regulator must accommodate unit-to-unit output voltage variation resulting from the flyback transformer circuitry, in addition to the voltage variation produced by changes in the anode current. This circuit additionally suffers from significant power dissipation, as do most regulators. Circuitry required for regulation of CRT anode voltages also significantly adds to the cost of a CRT anode power supply. Due to these disadvantages, the majority of CRT-based display devices utilize unregulated anode power supplies.

Figure 2:
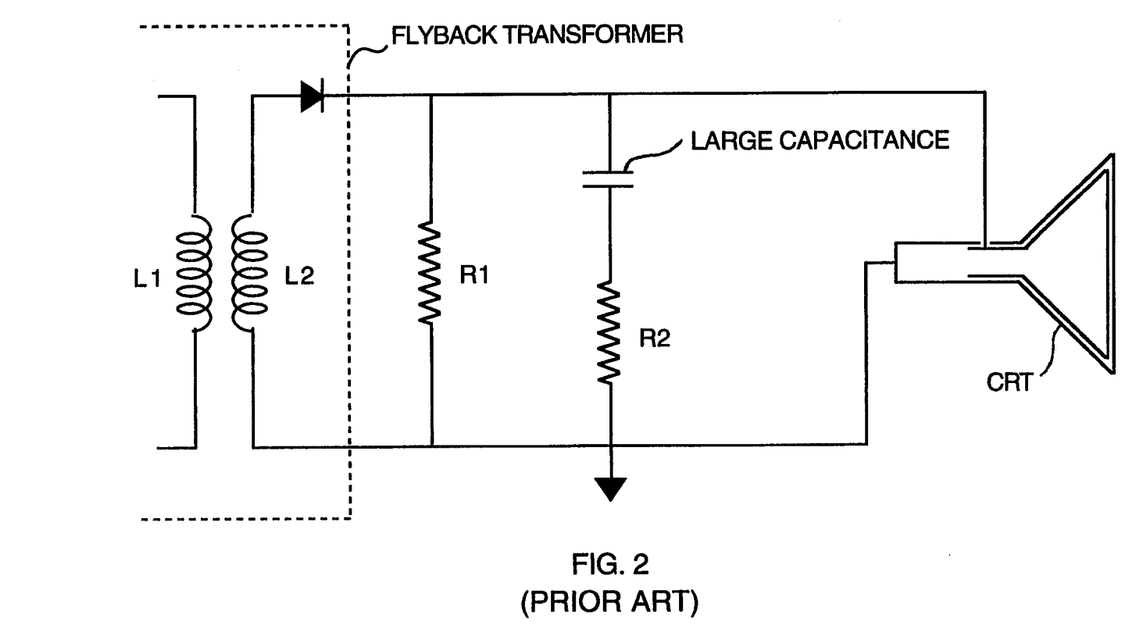
FIG. 2 shows a circuit used in prior art for reducing ELF electric fields through use of a large bypass capacitance.

An additional approach which addresses reduction of CRT anode voltage variation as a means for reducing ELF electric fields, involves minimization of the impedance connected to the CRT anode. In the circuit of FIG. 2, this is accomplished through the use of a passive bypass capacitor possessing very high capacitance. Unfortunately, such a capacitor is much more expensive and physically much larger than one having lower capacitance, again adversely affecting the economic aspects of CRT design and manufacture. Use of this type of capacitor also increases the potential for damage to the CRT due to a sudden electrical discharge, also known as arcing.

What is needed is an efficient and cost effective circuit for reducing ELF electric fields radiated from the anode of a CRT, while also reducing geometric image distortion in the CRT display.

SUMMARY OF THE INVENTION

The present invention is a circuit for reducing ELF electric fields radiated from a CRT anode through reduction of CRT anode voltage fluctuations while allowing the use of an unregulated anode power supply and a small capacitor. The circuit produces a gain-modified impedance incorporated within a feedback connection to the CRT anode.

The circuit of the present invention comprises a high-voltage power supply means, a CRT, a voltage sensing means, an amplification means, and a capacitance incorporated within a feedback coupling. A voltage fluctuation produced on the CRT anode is detected by the voltage sensing means, and input into the amplification means. The amplification means produces an inverted version of the anode voltage fluctuation, which is applied to the feedback coupling in order to reduce the anode impedance. This impedance reduction in turn reduces the magnitude of the CRT anode voltage fluctuation, thereby reducing the magnitude of the attendant ELF electric field.

DETAILED DESCRIPTION OF THE PREFERRED EMBODIMENTS

Figure 3A:
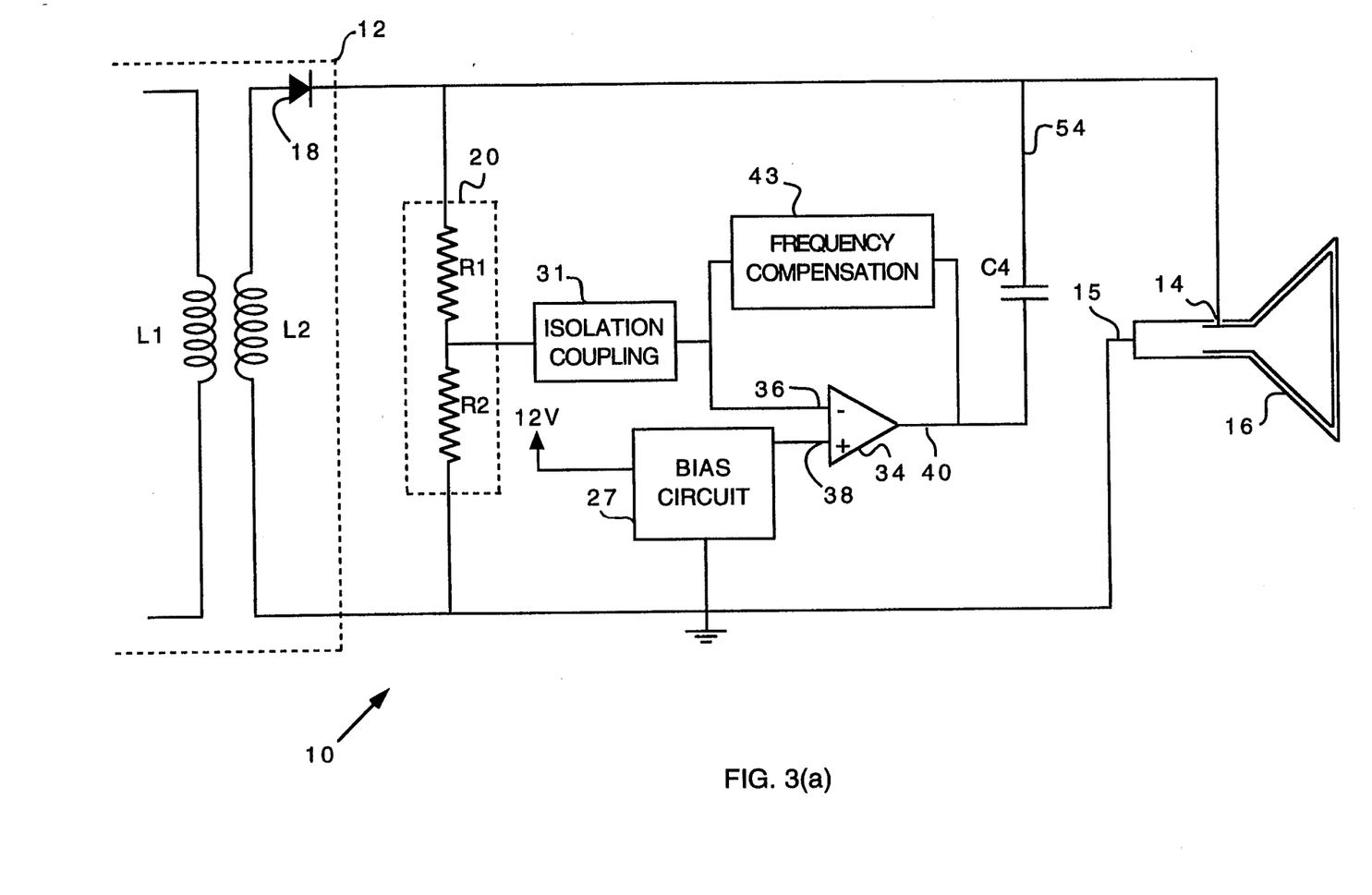
FIGS. 3(a), 3(b), 3(c) and 3(d) show a preferred embodiment of a circuit for reducing ELF electric fields radiated from CRT devices constructed in accordance with the present invention.

Referring now to FIG. 3(a), a diagram is shown of a circuit 10 for reducing ELF electric fields radiated from CRT devices constructed in accordance with the present invention. The input to circuit 10 comprises a high-voltage power supply, which in this embodiment is implemented as a flyback transformer 12. Flyback transformer 12 is conventional, having a primary and secondary coils L1 and L2, and is coupled to a rectifying means, herein implemented as a diode 18. The flyback transformer 12 is used to power a CRT 16 having an anode 14 and a cathode 15. A voltage divider 20 and bias circuit 27 are used to bias operational amplifier 34. An AC isolation coupling 31 is used to filter an inverting input 36 to the amplifier 34, and a compensation coupling 43 provides filtering of the feedback utilized in the amplifier. An output 40 of the operational amplifier 34 is further electrically coupled to a feedback capacitor C4, which is in turn connected to the CRT anode 14, thus forming an anode feedback coupling 54 between the voltage divider 20, the AC isolation coupling 31, the amplifier 34, and the CRT anode 14.

Voltage divider 20, consisting of R1 and R2, senses the voltage on the CRT anode 14, and delivers a corresponding reduced-amplitude voltage to the AC isolation coupling 31. Preferred component values for resistors R1 and R2 are approximately 100 M$\Omega$ and 43 k$\Omega$, respectively. A wide range of alternative resistor values, similarly proportioned would prove equally effective. The reduced-amplitude voltage delivered by voltage divider 20 comprises a DC voltage level, upon which an AC voltage corresponding to CRT anode 14 voltage variation is superimposed. Since the voltages present on a CRT anode 14 can be up to 30 kilovolts, and anode 14 voltage variations can be several kilovolts, the anode voltage cannot be directly applied to amplifier 34. Isolation coupling 31 passes the AC component of the voltage supplied by voltage divider 20 to the inverting input 36 of amplifier 34, while blocking the DC component. The operational amplifier 34 in turn inverts and amplifies this AC voltage to produce a voltage at its output 40 which is routed through a frequency compensation coupling 43 in order to ensure stable amplification. The voltage generated by the operational amplifier 34 is also applied to the anode feedback coupling 54 in order to multiply the effect the feedback capacitor C4 has upon the anode 14, thereby reducing the impedance coupled to the anode. The approximate preferred value of C4 is 1000 pF. This impedance reduction in turn reduces the magnitude of the voltage variation which the voltage divider 20 senses from the CRT anode 14. Since anode 14 voltage variations produce ELF electric fields and cause geometric image distortions, this reduction of the voltage variation sensed at the CRT anode 14 reduces ELF electric field magnitudes and stabilizes the displayed image.

Figure 3B:
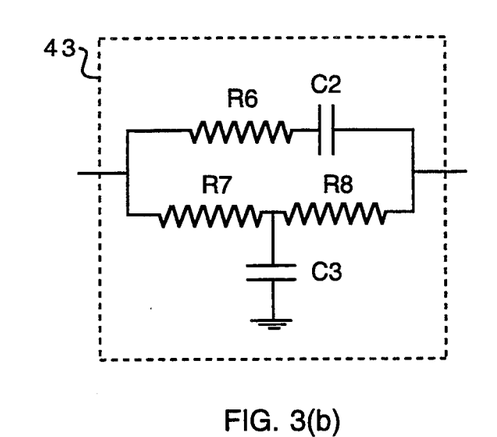

Referring now to FIG. 3(b), a detailed schematic is shown of the preferred embodiment of the compensation coupling 43. The purpose of compensation coupling 43 is to frequency stabilize the amplifier circuit and to prevent unwanted oscillation. At the frequencies of interest, capacitor C3 shunts voltage signals through the two resistors R7 and R8, to ground. Preferable component values are approximately 1 M$\Omega$ for each of the two resistors R7 and R8, and 10 $\mu$F for the capacitor, C3. The component values within the frequency compensation coupling 43 are chosen based upon the gain and frequency response of the operational amplifier 34. This gain is chosen to be as large as possible without causing oscillation of the amplifier 34.

Figure 3C:
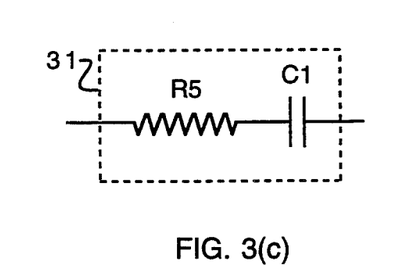

Referring now to FIG. 3(c), a detailed schematic is shown of the preferred embodiment of the isolation coupling 31. Isolation coupling 31 consists of the series connection of resistor R5 and capacitor C1. The purpose of this coupling 31 is to isolate amplifier 34 from the DC voltage component and to limit the AC current signal delivered to the amplifier input 36. Preferred component values for isolation coupling 31 are approximately an R5 of 10 k$\Omega$, and a C1 of 0.1 $\mu$F.

Figure 3D:
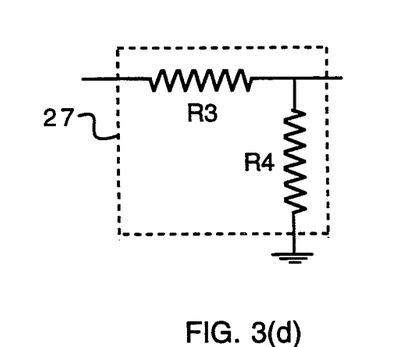

Referring now to FIG. 3(d), a detailed schematic is shown of the preferred embodiment of bias circuit 27 providing bias to the non-inverting input of amplifier 38. Resistors R3 and R4 of bias circuit 27 are approximately 4.7 M$\Omega$ in the preferred embodiment. It would be obvious to one of ordinary skill in the art that this bias could also be supplied by a voltage reference or other means.

Within a CRT 16 display device, one or more electron guns facilitate the generation of a CRT image. Typically, the cathode is biased at a potential 12 and 150V, while the CRT anode 14 is biased at a more positive voltage. A voltage placed across the CRT anode 14 therefore serves to accelerate electrons emitted from an electron gun towards the CRT 16 display. The electrons accelerated in this manner comprise an electron-beam current within the CRT 16, which gives rise to a current in the CRT anode 14. The electron beam current varies considerably as a result of changes in displayed information or user-adjustment of CRT 16 display controls such as brightness or contrast. Such changes produce corresponding changes in the anode 14 current, which in turn give rise to attendant variations in the anode 14 voltage.

A changing electric potential applied to a conductive object generates an AC electric field which radiates outward from the object. Voltage variations on the CRT anode 14 therefore produce electric fields which radiate from the anode 14. These electric fields have frequency components in the range from approximately 5 to 2000 Hertz; fields having oscillations within this range are categorized as extremely low frequency, or ELF, fields. Since the ELF electric field is produced by voltage variations on the CRT anode 14, reduction of such voltage variations results in a decrease in the ELF electric field magnitude.

In addition to the CRT anode 14, several electrodes and possibly one or more magnetic field yokes within the CRT 16 affect the electron-beam current in order to produce an unage having predetermined characteristics. An electron beam experiencing a given acceleration due to the CRT anode 14 voltage can be deflected by such means, thereby altering its position on the display. For electrons traveling in the presence of a field produced by an electrode or magnetic field yoke, the extent of this deflection is dependent upon the length of time the deflecting field acts upon the electrons. As electrons are accelerated towards the CRT anode 14, variations in the anode 14 voltage affect the electrons' acceleration, and thereby affect the amount of time a deflecting field can act upon the electrons. Anode 14 voltage variations thus produce unwanted changes in the appearance of an image. Such geometric image distortions generally have an inverse-square-root relationship with anode voltage variations; for instance, a 4% increase in anode 14 voltage will result in a 2% decrease in size for that portion of the image which was generated during the voltage variation.

The anode 14 voltage varies as a result of changes in the electron-beam current within the CRT 16. The magnitude of the anode 14 voltage variation as a function of this current is given by Ohm's law, namely $V_a = I_a * Z_a$, where $V_a$ is the anode 14 voltage variation produced by the changing CRT 16 current $I_a$, and $Z_a$ is the impedance coupled to the anode 14. Thus, in order to reduce voltage variations at the CRT anode 14 and thereby reduce the magnitude of ELF electric fields which radiate therefrom, the impedance coupled to the anode 14 must be reduced. This is achieved through the circuit 10 of the present invention.

Figure 4:
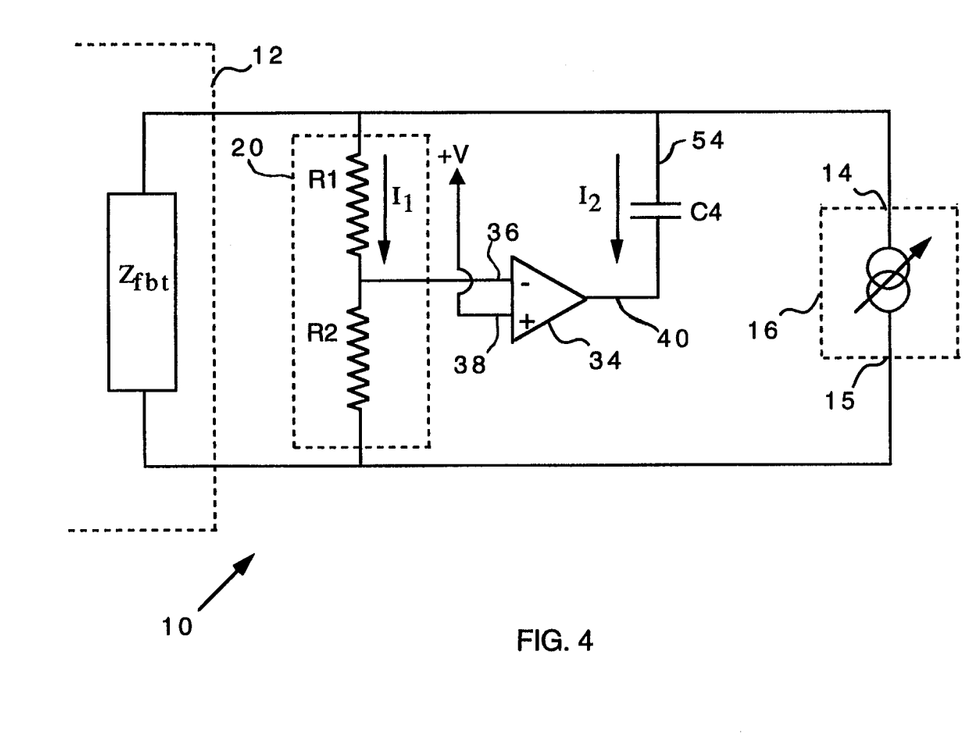
FIG. 4 shows a representation of the circuit of FIG. 3, wherein the CRT is modeled as having a variable current source.

Referring also now to FIG. 4, portions of the circuit 10 of FIG. 3 are represented in terms of their influence upon anode 14 voltage variations. The CRT 16 is modeled as having a variable current source which generates the changing CRT 16 current, and the flyback transformer 12 is represented as having an impedance $Z_{fbt}$. Since the second bias circuit 27 (FIG. 3(d)) simply supplies a bias to the non-inverting input 38 of the operational amplifier 34, it is represented as a coupling to a voltage. The frequency compensation coupling 43 (FIG. 3(b)) serves only to stabilize the circuit, and is ignored in the analysis below. In addition, the resistor R5 in the AC isolation coupling 31 (FIG. 3(c)) serves only to isolate the capacitor C1 in this coupling from the first voltage divider 20. Moreover, this capacitor C1 preferably has a very low impedance. Thus, the AC isolation coupling 31 will also be ignored in the analysis below.

The circuit 10 of FIG. 4 includes current paths through the voltage divider 20 and the capacitor C4. The current $I_1$ through the voltage divider 20 is simply $$I_1 = V_a/(R_1+R_2) \tag{1}$$

where $V_a$ is the AC voltage at the CRT anode 14 resulting from the changing CRT 16 current $I_1$. The voltage at the output 40 of the operational amplifier 34 is related to that at the inverting input 36 by an inverting gain $A_v$, which is a negative quantity having a magnitude larger than 1. The voltage present at inverting input 36 of the operational amplifier 34 equals $\beta V_a$, where $\beta$ represents the attenuation provided by the voltage divider 20 and is given by $$\beta = R2/(R1+R2) \tag{2}$$

Thus, at the output 40 of the operational amplifier 34, the voltage is $$V_o = -(A_v\beta)V_a \tag{3}$$

From this result, the current $I_2$ through the feedback capacitor C4 is found to be $$I_2 = V_a(1+A_v\beta)j\Omega C \tag{4}$$

where C is the value of the feedback capacitor C4 and $\Omega$ is the radian frequency of the CRT 16 current. Upon combining equations (1) and (4), the impedance coupled to the CRT anode 14, neglecting the impedance of the flyback transformer 12, is given by $$Z_a = 1/(j\Omega C(1+A_v\beta)+1/(R_1+R_2)) \tag{5}$$

Taking the impedance of the flyback transformer 12 into account yields $$Z_a = 1/(Z_{fbt}(j\Omega C(1+A_v\beta)+1/(R_1+R_2))+1/Z_{fbt}) \tag{6}$$

where $Z_{fbt}$ is the impedance of the flyback transformer 12. As indicated by equations (5) and (6), this impedance is modified by the gain $A_v$ of the operational amplifier 34, such that greater gain results in lower impedance. The operational amplifier 34 multiplies the effect of the feedback capacitor C4 by the factor $(1+A_v\beta)$. In practice, $A_v$ is chosen to be as large as possible, thereby providing a large impedance reduction, consequently reducing ELF electric fields radiated from the CRT anode 14, as well as reducing geometric image distortions, while allowing use of a much smaller feedback capacitor C4 than that required in the prior art. Moreover, the circuit of the present invention is unaffected by unit-to-unit variation in flyback transformer voltage, and its power dissipation is much lower than that found in prior art involving voltage regulation. From the above equations, it can be seen that a wide range of capacitor values can be used for C4. Preferably a value for C4 is chosen of less than 1 $\mu$F. A C4 value of 1000 pF is used in the preferred embodiment.

Figure 5:
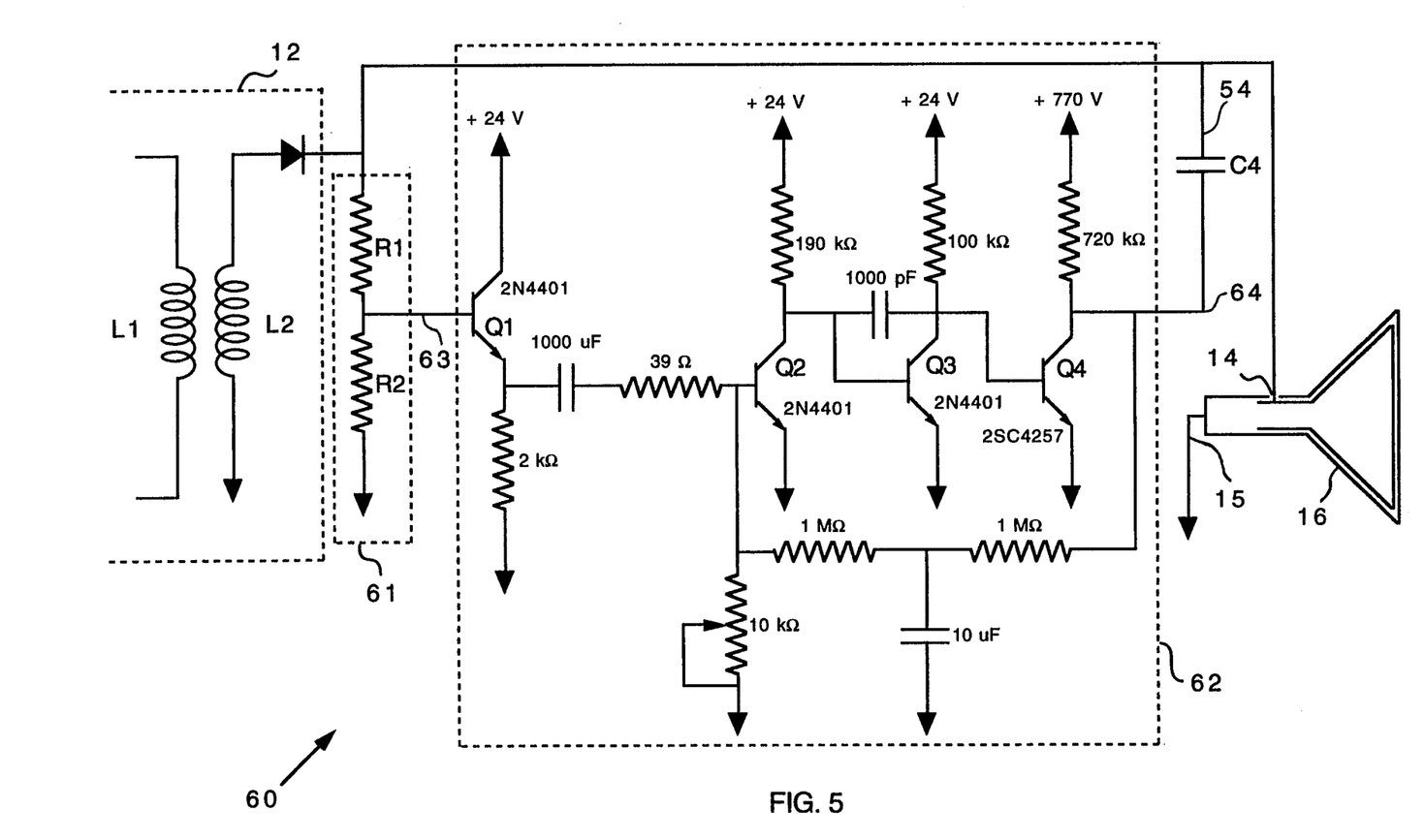
FIG. 5 shows an alternative embodiment of the present invention in which a single input, multistage transistor amplifier is used to achieve an inverting gain $A_v$.

Referring also now to FIG. 5, a circuit diagram of an alternative embodiment 60 of the present invention is shown in which a single-input multistage transistor amplifier 62 is used to achieve the inverting gain $A_v$ realized by the operational amplifier 34 in the preferred embodiment 10. This circuit 60 comprises a power supply, herein implemented as a flyback transformer 12; a voltage sensor, herein implemented as a voltage divider 61; an amplifier 62 having a single input 63 and an output 64, comprising a plurality of resistors, capacitors and transistors Q1 through Q4, forming an input stage, an amplification stage, and an output stage; and a feedback capacitor C4 within an anode feedback coupling 54.

The flyback transformer 12 is electrically coupled to the CRT anode 14 and the voltage divider 61. The voltage divider is also electrically coupled to transistor Q1, which functions within the input stage of the multistage transistor amplifier 62. The base contact of transistor Q1 is coupled to the amplifier's input. Transistors Q2 and Q3 function within the amplification stage, in which transistor Q2 is electrically coupled to the input stage and to transistor Q3, and transistor Q3 is electrically coupled to the output stage. Transistor Q4 operates within the output stage; the collector of transistor Q4 is electrically coupled to the amplifier's output 64. The amplifier output 64 is electrically coupled to the feedback capacitor C4, which is in turn electrically coupled to the anode feedback coupling 54. The anode feedback coupling 54 provides a feedback path coupling the CRT anode 14, the voltage divider 61, the single-input multistage transistor amplifier 60, and the feedback capacitor C4.

The flyback transformer 12 provides a high-voltage to the CRT anode 14. Anode 14 voltage variations produced by changes in the electron-beam current within the CRT 16 are sensed by the voltage divider 61, which attenuates such voltage variations, thereby producing a voltage signal with a magnitude acceptable for application to the input stage of the amplifier 62. This voltage signal comprises an AC component, corresponding to the anode 14 voltage variation, superimposed upon a DC component. The input stage of the amplifier 62 delivers only the AC voltage to the amplification stage, which amplifies and inverts this signal and delivers it to the output stage. The output stage further amplifies the signal received from the amplification stage. Since the output stage is electrically coupled to the feedback capacitor C4, the inverted and amplified version of the anode voltage variation present at the amplifier's output 64 serves to multiply the effect the feedback capacitor C4 has upon the CRT anode, thereby decreasing the impedance coupled to the anode 14. This impedance reduction produces an attendant reduction in the anode 14 voltage variation which was sensed by the voltage divider 61, and therefore results in a reduced ELF electric field magnitude and greater stability in a displayed image.

Preferred component values within the multistage transistor amplifier 62 are indicated in FIG. 5; the preferred values for the resistors in the voltage divider 61 are identical to those used in the first voltage divider in the circuit 10 of FIG. 3. The feedback capacitor C4 also has the same value as in the circuit 10 of FIG. 3. The gain of the multistage transistor amplifier 62 should be as large as possible in order to maximize the benefits realized from this circuit 60.

Although the circuit of the present invention has been described with respect to CRT-based display devices, it is also applicable to beam-matrix display devices. A beam-matrix display device comprises an array of electron guns, in which each electron gun is utilized for generating a portion of an image. In the simplest configuration, all electron guns share the same anode, to which the circuit of the present invention would be applied.

While the present invention has been described with reference to certain preferred embodiments, those skilled in the art will recognize that various modifications may be provided. For example, modifications might include, but would not be limited to, use of a capacitive voltage sensing means, or use of a transformer for coupling the output of the amplifier to the capacitor. These and other variations upon and modifications to the preferred embodiment are provided for by the present invention which is limited only by the following claims.

What is claimed is:

1. A circuit for reducing ELF electric fields radiated from CRT devices, the circuit comprising:
   a CRT having a cathode and an anode;
   power supply means electrically coupled between the anode and the cathode for providing bias to the CRT;
   amplification means having a first input electrically coupled to the power supply means and to the anode, and an output electrically coupled to the anode, for supplying an amplified anode voltage variation signal to the anode; and
   a capacitor coupled between the amplification means and the anode, the coupling maintained by the capacitor for lowering the anode impedance such that the resulting anode impedance is inversely related to the product of the capacitance of the capacitor and the voltage gain of the amplification means.

2. The circuit for reducing ELF electric fields according to claim 1, further comprising voltage sensing means coupled between the anode and the first input of the amplification means for sampling the CRT anode voltage.

3. The circuit for reducing ELF electric fields according to claim 2, wherein the voltage sensing means comprises a voltage divider.

4. The circuit for reducing ELF electric fields according to claim 3, wherein the voltage divider means further comprises a first resistor electrically coupled between the anode and the first input, and a second resistor electrically coupled to the first resistor and the CRT cathode.

5. The circuit for reducing ELF electric fields according to claim 2, further comprising a second input, wherein the second input of the amplification means is electrically coupled to a bias circuit.

6. The circuit for reducing ELF electric fields according to claim 1, wherein the power supply comprises a flyback transformer having a primary coil, a secondary coil, and a rectifying means.

7. The circuit for reducing ELF electric fields according to claim 6, wherein the rectifying means comprises a diode.

8. The circuit for reducing ELF electric fields according to claim 6, wherein the rectifying means is electrically coupled between the secondary coil and the anode.

9. The circuit for reducing ELF electric fields according to claim 6, wherein the secondary coil is electrically coupled to the cathode.

10. The circuit for reducing ELF electric fields according to claim 1, wherein the amplification means is coupled to the power supply means through an isolation means.

11. The circuit for reducing ELF electric fields according to claim 10, wherein the isolation means further comprises a series connected resistor and capacitor for isolating the amplification means from DC voltage.

12. The circuit for reducing ELF electric fields according to claim 1, wherein a frequency compensation means is coupled between the output and the first input, for stabilizing the amplifier means.

13. A method for reducing ELF electric fields radiated from CRT devices having an anode and a cathode, wherein the CRT is biased from a power supply, the method comprising the steps of:
   applying a voltage signal from the power supply, the voltage signal applied between the anode and the cathode of the CRT;
   applying an amplified anode voltage variation signal to the anode from an amplifier electrically coupled to the power supply and the anode; and
   capacitively coupling the amplifier to the anode in order to lower the anode impedance by an amount inversely proportional to the product of the capacitance of the capacitor and the gain of the amplifier.

14. The method for reducing ELF electric fields radiated from CRT devices according to claim 13, wherein the resulting anode impedance is inversely related to the product of the coupled capacitance and the voltage gain of the amplifier.

15. The method for reducing ELF electric fields radiated from CRT devices according to claim 13 wherein the voltage signal from the power supply is further rectified.

16. The method for reducing ELF electric fields radiated from CRT devices according to claim 15 wherein the voltage signal from the power supply is rectified using a diode coupled between the power supply and the amplifier.

* * * * *

UNITED STATES PATENT AND TRADEMARK OFFICE
CERTIFICATE OF CORRECTION

PATENT NO. : 5,396,151
DATED : March 7, 1995
INVENTOR(S) : Richard D. Cappels, Sr.

It is certified that error appears in the above-indentified patent and that said Letters Patent is hereby corrected as shown below:

Column 4, line 8, delete "RS" and insert -- R5 -- .

Column 4, line 53, delete "unage" and insert -- image -- .

Column 5, line 59, delete "$I_2=V_a(1+A_v\beta)j\Omega C$" and insert --

$$I_2=V_a(1+A_v\beta)j\omega C$$ --.

Column 5, line 62, delete "$\Omega$" and insert -- $\omega$ -- .

Column 5, line 67, delete "$Z_a=1/(j\Omega C(1+A_v\beta) + 1/(R_1+R_2))$" and insert --

$$Z_a=1/(j\omega C(1+A_v\beta) + 1/(R_1+R_2))$$ --.

Column 6, line 4, delete "$Z_a=1/(Z_{fbt}(j\Omega C(1+A_v\beta) + 1/(R_1+R_2)) + 1/Z_{fbt})$"

and insert -- $Z_a=1/(Z_{fbt}(j\omega C(1+A_v\beta) + 1/(R_1+R_2)) + 1/Z_{fbt})$ --.

Column 6, line 24, delete "μF" and insert -- uF -- .

Signed and Sealed this

Thirteenth Day of June, 1995

Attest:

BRUCE LEHMAN

*Attesting Officer*     *Commissioner of Patents and Trademarks*